United States Patent

Tsutsui et al.

Patent Number: 5,880,056
Date of Patent: Mar. 9, 1999

[54] OLEFIN POLYMERIZATION CATALYST AND PROCESS FOR OLEFIN POLYMERIZATION

[75] Inventors: Toshiyuki Tsutsui; Masaaki Ohgizawa, both of Kuga-gun, Japan

[73] Assignee: Mitsui Petrochemical Industries, Ltd., Tokyo, Japan

[21] Appl. No.: 954,073

[22] Filed: Oct. 20, 1997

Related U.S. Application Data

[63] Continuation of Ser. No. 527,685, Sep. 13, 1995, abandoned.

[30] Foreign Application Priority Data

Sep. 21, 1994 [JP] Japan .................................. 6-226872

[51] Int. Cl.⁶ ............................ B01J 31/00; B01J 37/00; C08F 4/02; C08F 4/60
[52] U.S. Cl. ..................... 502/103; 502/108; 502/117; 502/152; 526/160; 526/943; 556/53
[58] Field of Search ..................... 502/103, 108, 502/117, 152

[56] References Cited

U.S. PATENT DOCUMENTS

| | | | |
|---|---|---|---|
| 4,871,705 | 10/1989 | Hoel | 502/108 |
| 5,106,804 | 4/1992 | Bailly et al. | 502/108 |
| 5,132,262 | 7/1992 | Rieger et al. | 502/117 |
| 5,252,529 | 10/1993 | Ueda et al. | 502/108 |
| 5,279,999 | 1/1994 | DeBoer et al. | 502/117 |
| 5,308,816 | 5/1994 | Tsutsui et al. | 502/108 |

FOREIGN PATENT DOCUMENTS

| | | |
|---|---|---|
| 0 323 716 | 7/1989 | European Pat. Off. . |
| 0 426 637 | 5/1991 | European Pat. Off. . |
| 0426638 | 5/1991 | European Pat. Off. . |
| 0513380 | 11/1992 | European Pat. Off. . |
| 0582268 | 2/1994 | European Pat. Off. . |
| 0591756 | 4/1994 | European Pat. Off. . |
| WO 91/09882 | 7/1991 | WIPO . |

*Primary Examiner*—Mark L. Bell
*Assistant Examiner*—J. Pasterczyk
*Attorney, Agent, or Firm*—Birch, Stewart, Kolasch & Birch, LLP

[57] ABSTRACT

Disclosed is an olefin polymerization catalyst comprising (A) a transition metal compound represented by the formula (I) $R^1R^2MX_2$ (wherein M is a transition metal atom, $R^1$ and $R^2$ are each a cycloalkadienyl group having an aryl group and a saturated hydrocarbon group as substituents, and X is a halogen atom or the like) and (B) at least one compound selected from (b1) an organoaluminum oxy-compound, (b2) an ionized ionic compound and (b3) an organoaluminum compound. Also disclosed is a process for olefin polymerization comprising polymerizing an olefin in the presence of the above-mentioned catalyst. According to the present invention, an olefin copolymer having a crystallization temperature and a melting point both lower than those of the conventional copolymers can be prepared in the case of that the feeding amount of comonomer is smaller than those conventionally used.

3 Claims, 1 Drawing Sheet

(A) Transition metal component

M: transition metal   X: halogen atom, etc.
R¹, R²: cycloalkadienyl group
(R¹ and R² have aryl group and hydrocarbon as substituents.)

(B) Organometallic component (C) The third component
(Fine particle carrier)

OLEFIN POLYMERIZATION CATALYST AND PROCESS FOR OLEFIN POLYMERIZATION

This application is a continuation of application Ser. No. 08/527,685 filed on Sep. 13, 1995, now abandoned.

FIELD OF THE INVENTION

The present invention relates to an olefin polymerization catalyst and a process for olefin polymerization. More particularly, the invention relates to an olefin polymerization catalyst which is capable of giving an olefin copolymer having a crystallization temperature and a melting point, which are both lower than those of conventional olefin copolymers and to a process for olefin polymerization using said catalyst.

BACKGROUND OF THE INVENTION

Olefin polymers such as ethylene copolymers have been conventionally used as materials for hollow molded articles, extrusion molded articles, films, sheets, etc. One well known olefin polymerization catalyst for preparing these olefin polymers is a catalyst comprising a transition metal catalyst component such as zirconocene and an organoaluminum oxy-compound (aluminoxane). As the transition metal catalyst component used for this catalyst, for example, ethylenebis(indenyl)zirconium dichloride is known. Olefin copolymers obtained by using this transition metal catalyst component are characterized in that their molecular weight distributions are narrow and films formed from the copolymers are free from tackiness.

The properties required for the olefin polymers vary according to the use and the molding process thereof. In order to adjust the properties, the ratio between the comonomers has been conventionally controlled so as to alter the crystallization temperature, the melting point, etc. of the resulting copolymer.

In the use of the conventional catalysts, however, there is a limit to the alteration of the crystallization temperature and the melting point.

U.S. Pat. No. 5,279,999 discloses a catalyst composition obtained by contacting (a) a Group IVA metal compound of the general formula $(Cp)_p MeX_{4-p}$ (wherein Cp is, independently, cyclopentadienyl groups substituted with one or more hydrocarbyl groups, and at least one cyclopentadienyl group is substituted with a single, optionally substituted, aryl group. Me is a Group IVA metal, X is one or more non-cyclopentadienyl substituents attached to the Group IVA metal, wherein the substituents are hydrocarbyl groups, hydrocarboxy groups, hydrocarbamide groups, hydrogen or halogen, and p is an integer of from 1 to 4.) and (b) an aluminoxane for (co)polymerizing olefins.

OBJECT OF THE INVENTION

The present invention has been made in view of the prior art as mentioned above, and it is an object of the invention to provide an olefin polymerization catalyst capable of giving an olefin copolymer having a crystallization temperature and a melting point that are both lower than those of conventional olefin copolymers and to provide a process for olefin polymerization using said catalyst.

SUMMARY OF THE INVENTION

The first olefin polymerization catalyst according to the invention comprises:

(A) a transition metal compound represented by the following formula (I):

$$R^1R^2MX_2 \qquad (I)$$

wherein M is a transition metal atom selected from Group IVB of the periodic table, $R^1$ and $R^2$ are each a ligand coordinated to the transition metal atom M, and are each a cycloalkadienyl group having at least two substituents, and may be the same as or different from each other, one of the substituents for substituting the cycloalkadienyl group is an aryl group and the other is a hydrocarbon group of 1 to 12 carbon atoms, X is a group or an atom selected from a hydrocarbon group of 1 to 12 carbon atoms, an alkoxy group, an aryloxy group, a trialkylsilyl group and a halogen atom, and two of X may be the same as or different from each other;

and
(B) at least one compound selected from:
(b1) an organoaluminum oxy-compound,
(b2) an ionizing ionic compound, and
(b3) an organoaluminum compound.

The second olefin polymerization catalyst according to the invention comprises:
a fine particle carrier;
(A) a transition metal compound represented by the above formula (I);
and
(B) at least one compound selected from:
(b1) an organoaluminum oxy-compound,
(b2) an ionizing ionic compound, and
(b3) an organoaluminum compound;
said component (A) and/or said component (B) being supported on the fine particle carrier.

The third olefin polymerization catalyst according to the invention is an olefin polymerization catalyst obtained by prepolymerizing olefins on a catalyst component, said catalyst component comprising:
a fine particle carrier;
(A) a transition metal compound represented by the above formula (I);
and
(B) at least one compound selected from:
(b1) an organoaluminum oxy-compound,
(b2) an ionizing ionic compound, and
(b3) an organoaluminum compound;
said component (A) and/or said component (B) being supported on the fine particle carrier.

The process for olefin polymerization according to the invention is characterized by polymerizing an olefin in the presence of any one of the first to the third olefin polymerization catalysts. In the process of the invention, an organoaluminum compound may be used in combination with the second or the third olefin polymerization catalyst.

By the use of the olefin polymerization catalyst of the invention, an olefin copolymer having a crystallization temperature and a melting point both lower than those of conventional olefin copolymers can be obtained in the case of that the amount of comonomer is smaller than those conventionally used.

DETAILED DESCRIPTION OF THE INVENTION

The olefin polymerization catalyst and the process for olefin polymerization according to the invention will be described in detail hereinafter.

The meaning of the term "polymerization" used herein is not limited to "homopolymerization" but also comprehends "copolymerization". Also, the meaning of the term "polymer" used herein is not limited to "homopolymer" but also comprehends "copolymer".

The first olefin polymerization catalyst according to the invention is formed from:

(A) a transition metal compound represented by the formula (I) described below, and (B) at least one compound selected from:

(b1) an organoaluminum oxy-compound, (b2) an ionizing ionic compound, and (b3) an organoaluminum compound.

Figure 1:
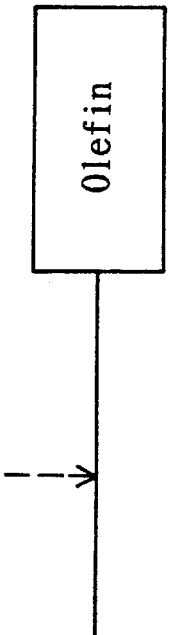
FIG. 1 is an explanatory view showing steps of a process for preparing an olefin polymerization catalyst according to the invention.
Figure 1:
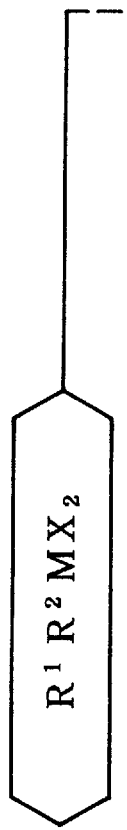
Figure 1:
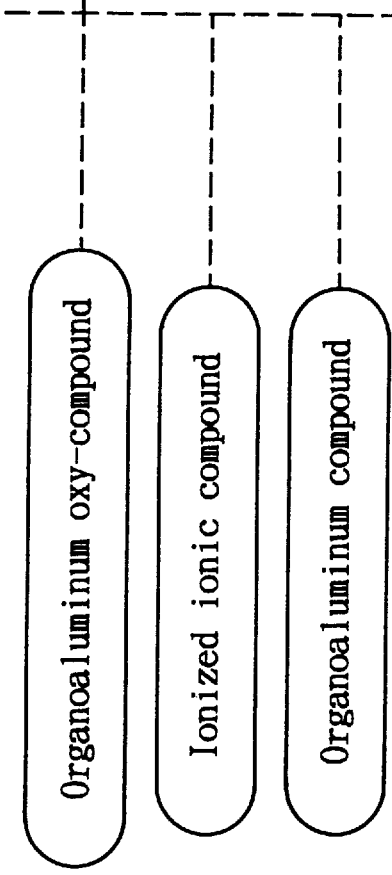

FIG. 1 is an explanatory view showing steps of a process for preparing the olefin polymerization catalyst according to the invention.

The transition metal compound (A) for forming the olefin polymerization catalyst of the invention is a compound represented by the following formula (I).

$$R^1R^2MX_2 \qquad (I)$$

In the formula (I), M is a transition metal atom selected from Group IVB of the periodic table, specifically, titanium, zirconium or hafnium.

$R^1$ and $R^2$ are each a ligand coordinated to the transition metal atom M, they are each a cycloalkadienyl group having two or more substituents, and they may be the same as or different from each other. Examples of the cycloalkadienyl groups include cyclopentadienyl, cyclohexadienyl and cycloheptadienyl. In this invention, $R^1$ and $R^2$ are each preferably substituted cyclopentadienyl.

The substituted cycloalkadienyl group indicated by each of $R^1$ and $R^2$ has, as substituents, an aryl group (substituent (i)) and a hydrocarbon group of 1 to 12 carbon atoms (substituent (ii)). The substituents for substituting $R^1$ and $R^2$ may be the same as or different from each other.

Each of $R^1$ and $R^2$ is preferably a di-substituted cycloalkadienyl group having a substituted- or a non-substituted aryl group and a saturated hydrocarbon group selected from the group consisting of linear chain, branched chain, alicyclic and alkyl-substituted alicyclic groups.

The aryl groups include a non-substituted aryl group and an aryl group substituted with one or more of (branched or linear) alkyl group. The alkyl group substituted on the aryl group is preferably a branched or linear alkyl group having 1 to 5 carbon atoms.

The saturated hydrocarbon group is preferably a branched or linear alkyl group having 1 to 12 carbon atoms, particularly 1 to 5 carbon atoms.

Examples of the aryl groups include phenyl, naphthyl, tolyl, dimethylphenyl and ethylphenyl.

Examples of the hydrocarbon groups of 1 to 12 carbon atoms include:

alkyl groups, such as methyl, ethyl, n-propyl, isopropyl, n-butyl, isobutyl, sec-butyl, tert-butyl, pentyl, hexyl, octyl, 2-ethylhexyl and decyl;

cycloalkyl groups, such as cyclopentyl, cyclohexyl and methylcyclopentyl;

aryl groups, such as phenyl and naphthyl;

alkylaryl groups, such as tolyl; and aralkyl groups, such as benzyl and neophyl.

The substituent (substituent (ii)) for substituting the cycloalkadienyl group together with the aryl group (substituent (i)) is preferably an alkyl group.

The cycloalkadienyl group may be substituted with plural substituents (ii), but in the invention the cycloalkadienyl group is preferably such a di-substituted group that the substituent (ii) and the aryl group (substituent (i)) have been positioned on 1,3-position.

X is a group or an atom selected from a hydrocarbon group of 1 to 12 carbon atoms, an alkoxy group, an aryloxy group, a trialkylsilyl group and a halogen atom, and two of X may be the same as of different from each other.

Specifically, there can be exemplified:

the same hydrocarbon groups of 1 to 12 carbon atoms as described above;

alkoxy groups, such as methoxy and ethoxy;

aryloxy groups, such as phenoxy, tolyloxy and dimethylphenoxy;

trialkylsilyl groups, such as trimethylsilyl and triethylsilyl; and halogen atoms, such as fluorine, chlorine, bromine and iodine.

The transition metal compound of the above formula (I) wherein $R^1$ and $R^2$ are each a substituted cyclopentadienyl group is represented by the following formula (II).

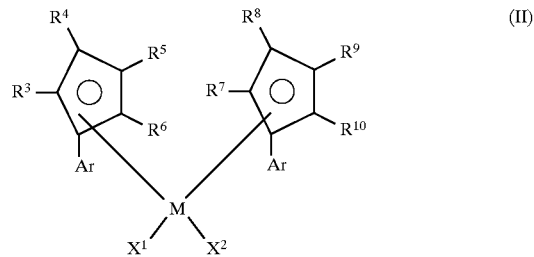

In the formula (II), Ar is an aryl group.

$R^3$ to $R^{10}$ are each a group or an atom selected from hydrocarbon groups of 1 to 12 carbon atoms and a hydrogen atom, and they may be the same as or different from each other. Examples of the hydrocarbon groups of 1 to 12 carbon atoms include those described above.

M is the same as above, and $X^1$ and $X^2$ are each the same as the aforementioned X.

Of the transition metal compounds represented by the formula (II), preferred are compounds having alkyl groups as $R^4$ (or $R^5$) and $R^9$ (or $R^8$) and having hydrogen atoms as others.

Listed below are examples of such transition metal compounds (A).

Bis(1,3-methylphenylcyclopentadienyl)zirconium dichloride,

Bis(1,3-ethylphenylcyclopentadienyl)zirconium dichloride,

Bis(1,3-ethyl-p-tolylcyclopentadienyl)zirconium dichloride,

Bis(1,3-methylphenylcyclopentadienyl)zirconium dimethyl,

Bis(1,3-ethylphenylcyclopentadienyl)zirconium dimethyl,

Bis(1,3-ethyl-p-tolylcyclopentadienyl)zirconium dimethyl,

Bis(1,3-methyl-m-tolylcyclopentadienyl)zirconium dichloride,

Bis(1,3-methyl-m-tolylcyclopentadienyl)zirconium dimethyl,

Bis(1,3-methyl-p-tolylcyclopentadienyl)zirconium dichloride,

Bis(1,3-methyl-p-tolylcyclopentadienyl)zirconium dimethyl,

Bis(1,3-methyl-o-tolylcyclopentadienyl)zirconium dichloride,

Bis(1,3-methyl-o-tolylcyclopentadienyl)zirconium dimethyl,

Bis(1,3-ethyl-m-tolylcyclopentadienyl)zirconium dichloride,

Bis(1,3-ethyl-m-tolylcyclopentadienyl)zirconium dimethyl,
Bis(1,3-methylnaphthylcyclopentadienyl)zirconium dichloride,
Bis(1,3-methylnaphthylcyclopentadienyl)zirconium dimethyl,
Bis(1,3-ethylnaphthylcyclopentadienyl)zirconium dichloride,
Bis(1,3-ethylnaphthylcyclopentadienyl)zirconium dimethyl,
Bis[1,3-methyl(dimethylphenyl)cyclopentadienyl]-zirconium dichloride,
Bis[1,3-methyl(dimethylphenyl)cyclopentadienyl]-zirconium dimethyl,
Bis[1,3-methyl(ethylphenyl)cyclopentadienyl]-zirconium dichloride, and
Bis[1,3-methyl(ethylphenyl)cyclopentadienyl]-zirconium dimethyl.

In addition to the above zirconium compounds, there can be also exemplified compounds in which zirconium is replaced with titanium or hafnium in the zirconium compounds as the transition metal compound (A).

The first olefin polymerization catalyst of the invention is formed from (A) the transition metal compound represented by the above formula (I) and (B) at least one compound selected from (b1) an organoaluminum oxy-compound, (b2) an ionizing ionic compound and (b3) an organoaluminum compound.

The organoaluminum oxy-compound (b1) may be aluminoxane conventionally known or may be such a benzene-insoluble organoaluminum oxy-compound as exemplified in Japanese Patent Laid-Open Publication No. 78687/1990.

Examples of the conventionally known aluminoxane include a chain organoaluminum oxy-compound represented by the following formula (i) and a cyclic organoaluminum oxy-compound represented by the following formula (ii), and in general the aluminoxane is used as a mixture thereof.

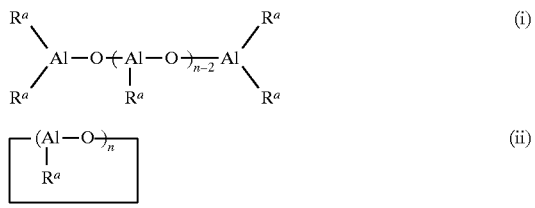

In the above formulas (i) and (ii), $R^a$ is a hydrocarbon group, such as an alkyl group of 1 to 20 carbon atoms (preferably 1 to 12 carbon atoms), an alkenyl group of 2 to 20 carbon atoms (preferably 2 to 12 carbon atoms), an aryl group of 6 to 20 carbon atoms (preferably 6 to 12 carbon atoms) or an arylalkyl group of 7 to 20 carbon atoms (preferably 7 to 12 carbon atoms); and n means a degree of polymerization and is usually 3 to 50, preferably 5 to 40, more preferably 7 to 40.

There is no specific limitation on the process for preparing the conventionally known aluminoxane, and it can be prepared by, for example, the following procedures.

(1) A procedure of adding an organoaluminum compound such as trialkylaluminum to a hydrocarbon medium suspension of compounds containing adsorbed water or salts containing water of crystallization, e.g., magnesium chloride hydrate, copper sulfate hydrate, aluminum sulfate hydrate, nickel sulfate hydrate and cerous chloride hydrate, so as to allow the organoaluminum compound to react with the adsorbed water or the water of crystallization.

(2) A procedure of allowing water, ice or water vapor to directly act on an organoaluminum compound such as trialkylaluminum in a medium such as benzene, toluene, ethyl ether or tetrahydrofuran.

(3) A procedure of allowing organotin oxide such as dimethyltin oxide or dibutyltin oxide to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the solution after recovery of aluminoxane and the remainder is redissolved in a solvent or suspended in a poor solvent for aluminoxane.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, preferred are trialkylaluminums and tricycloalkylaluminums, and particularly preferred is trimethylaluminum.

Also employable as the organoaluminum compound used for preparing the aluminoxane is isoprenylaluminum represented by the following formula:

$$(i\text{-}C_4H_9)_x Al_y (C_5H_{10})_z$$

wherein x, y, z are each a positive number, and $z \geq 2x$.

The organoaluminum compounds mentioned above may be used singly or in combination. For example, a combination of trimethylaluminum and triisobutylaluminum is employable.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof. Also employable are ethers such as ethyl ether and tetrahydrofuran. Of the solvents, particularly preferred are aromatic hydrocarbons and aliphatic hydrocarbons.

The ionizing ionic compound (b2) includes Lewis acid, ionic compounds and carborane compounds described in National Publications of International Patent No. 501950/1989 and No. 502036/1989, Japanese Patent Laid-Open Publications No. 179005/1991, No. 179006/1991, No. 207703/1991 and No. 207704/1991, and U.S. Pat. No. 5,321,106.

Examples of the Lewis acid include triphenylboron, tris (4-fluorophenyl)boron, tris(p-tolyl)boron, tris(o-tolyl)boron, tris(3,5-dimethylphenyl)boron, tris(pentafluorophenyl) boron, $MgCl_2$, $Al_2O_3$ and $SiO_2\text{—}Al_2O_3$.

Examples of the ionic compounds include triphenylcarbeniumtetrakis(pentafluorophenyl)borate, tri-n-butylammoniumtetrakis(pentafluorophenyl)borate, N,N-dimethylaniliniumtetrakis(pentafluorophenyl)borate and ferroceniumtetra(pentafluorophenyl)borate.

Examples of the carborane compounds include dodecaborane, 1-carbaundecaborane, bis-n-butylammonium (1-carbedodeca)borate, tri-b-butylammonium(7,8-dicarbaundeca)borate and tri-n-butylammonium (tridecahydride-7-carbundeca)borate.

These ionizing ionic compounds (b2) may be used singly or in combination of two or more kinds.

The organoaluminum compound (b3) is, for example, an organoaluminum compound represented by the following formula (iii):

$$R^b_n AlX_{3-n} \qquad (iii)$$

wherein $R^b$ is a hydrocarbon group of 1 to 12 carbon atoms, X is a halogen atom or hydrogen, and n is 1 to 3.

In the above formula (iii), $R^b$ is a hydrocarbon group of 1 to 12 carbon atoms, for example, an alkyl group, a cycloalkyl group or an aryl group. Examples thereof include alkyl groups such as methyl, ethyl, n-propyl, isopropyl, isobutyl, pentyl, hexyl and octyl; cycloalkyl groups such as cyclopentyl and cyclohexyl; and aryl groups such as phenyl and tolyl.

Examples of such organoaluminum compounds include:
trialkylaluminums, such as trimethylaluminum, triethylaluminum, triisopropylaluminum, triisobutylaluminum, trioctylaluminum, tri(2-ethylhexyl) aluminum and tridecylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (b3) is a compound represented by the following formula (iv):

$$R^b_n AlL_{3-n} \qquad (iv)$$

wherein $R^b$ is the same as above, L is —$OR^c$ group, —$OSiR^d_3$ group, —$OAlR^e_2$ group, —$NR^f_2$ group, —$SiR^g_3$ group or —$N(R^h)AlR^i_2$ group, n is 1 to 2, $R^c$, $R^d$, $R^e$ and $R^i$ are each methyl, ethyl, isopropyl, isobutyl, cyclohexyl, phenyl or the like, $R^f$ is hydrogen, methyl, ethyl, isopropyl, phenyl, trimethylsilyl or the like, and $R^g$ and $R^h$ are each methyl, ethyl or the like.

Of the organoaluminum compounds represented by the formula (iv), preferred are compounds of the formula $R^b_n Al(OAlR^e_2)_{3-n}$, e.g., $Et_2AlOAlEt_2$ and $(iso-Bu)_2AlOAl(iso-Bu)_2$.

Of the organoaluminum compounds represented by the formulas (iii) and (iv), compounds of the formula $R^b_3 Al$ are preferred, and compounds of said formula wherein $R^b$ is an isoalkyl group are particularly preferred.

The first olefin polymerization catalyst of the invention may contain water as a catalyst component in addition to the component (A) and the component (B). The water used in the invention is, for example, water dissolved in a polymerization solvent described later, or adsorbed water or water of crystallization contained in compounds or salts which are used for preparing the organoaluminum oxy-compound (b1).

The first olefin polymerization catalyst of the invention is formed from:
(A) the transition metal compound represented by the formula (I) [component (A)], and
(B) at least one compound selected from:
(b1) the organoaluminum oxy-compound [component (b1)],
(b2) the ionizing ionic compound [component (b2)], and
(b3) the organoaluminum compound [component (b3)].

At least one compound selected from the component (b1), the component (b2) and the component (b3) is sometimes referred to as "component (B)" hereinafter.

In this invention, it is desired to use, as the component (B), the component (b1) singly or in combination with the component (b3).

The first olefin polymerization catalyst can be prepared by, for example, mixing the component (A) and the component (B), and if desired, water as a catalyst component, in an inert hydrocarbon solvent or an olefin solvent.

Examples of the inert hydrocarbon solvents used for preparing the catalyst include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons.

Next, one example of the ratio between the components used in the preparation of the first olefin polymerization catalyst is described.

In the mixing of the component (A) and the component (B), the concentration of the component (A) is in the range of usually $10^{-8}$ to $10^{-1}$ mol/liter-solvent, preferably $10^{-7}$ to $5\times10^{-2}$ mol/liter-solvent, in terms of the transition metal atom.

When the organoaluminum oxy-compound (b1) is used as the component (B), an atomic ratio of aluminum in the component (b1) to the transition metal in the component (A), [Al/transition metal], is in the range of usually 10 to 10,000, preferably 20 to 5,000.

When the ionizing ionic compound (b2) is used as the component (B), a molar ratio of the component (A) to the component (b2), [component (A)/component (b2)], is in the range of usually 0.01 to 10, preferably 0.1 to 5.

When a combination of the organoaluminum oxy-compound (b1) and the organoaluminum compound (b3) is used as the component (B), the amount of the component (b1) is the same as above, and an atomic ratio of the aluminum atom (Al-b3) in the component (b3) to the aluminum atom (Al-b1) in the component (b1), [Al-b3/Al-b1], is in the range of usually 0.02 to 20, preferably 0.2 to 10.

The second olefin polymerization catalyst according to the invention comprises:
a fine particle carrier,
(A) the transition metal compound represented by the above formula (I), and
(B) at least one compound selected from:
(b1) the organoaluminum oxy-compound,
(b2) the ionizing ionic compound, and (b3) the organoaluminum compound;

said component (A) and/or said component (B) being supported on the fine particle carrier.

In this invention, it is desired to use, as the component (B), the component (b1) singly or in combination with the component (b3).

The fine particle carrier used in the invention is an inorganic or organic compound and is a granular or particulate solid having a diameter of 10 to 300 μm, preferably 20 to 200 μm.

The inorganic compound carrier is preferably a porous oxide, and examples thereof include $SiO_2$, $Al_2O_3$, MgO, $ZrO_2$, $TiO_2$, $B_2O_3$, CaO, ZnO, BaO, $ThO_2$ and mixtures of these oxides, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferred are compounds containing $SiO_2$ and/or $Al_2O_3$ as their major ingredient.

The above-mentioned inorganic oxides may contain carbonates, sulfates, nitrates and oxides, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_2$, $Na_2O$, $K_2O$ and $Li_2O$, in a small amount.

Although the properties of the fine particle carrier vary according to the kind and process for the preparation thereof, the fine particle carrier preferably used in the invention desirably has a specific surface area of 50 to 1,000 $m^2/g$, preferably 100 to 700 $m^2/g$, and has a pore volume of 0.3 to 2.5 $cm^3/g$. If necessary, the fine particle carrier is calcined at 100° to 1,000° C., preferably 150° to 700° C., before use.

The fine particle carrier desirably has an adsorbed water content of less than 1.0% by weight, preferably less than 0.05% by weight, and has a surface hydroxyl group content of not less than 1.0% by weight, preferably 1.5 to 4.0% by weight, particularly preferably 2.0 to 3.5% by weight.

The adsorbed water content (% by weight) and the surface hydroxyl group content (% by weight) of the fine particle carrier can be determined in the following manner.

[Adsorbed Water Content]

The weight reduction of the fine particle carrier after drying at 200° C. under ordinary pressure for 4 hours in a stream of nitrogen is measured, and a percentage of the weight after the drying to the weight before the drying is calculated.

[Surface Hydroxyl Group Content]

The weight of the fine particle carrier measured after the carrier is dried at 200° C. under atmospheric pressure for 4 hours in a stream of nitrogen is taken as X (g). The fine particle carrier is calcined at 1,000° C. for 20 hours to remove the surface hydroxyl group. The thus calcined product is weighed, and the weight obtained is taken as Y (g). The surface hydroxyl group content is defined by the following equation.

Surface hydroxyl group (% by weight)=$\{(X-Y)/X\} \times 100$

Also employable as the fine particle carrier in this invention is an organic compound of granular or particulate solid having a diameter of 10 to 300 μm. Examples of such organic compounds include (co)polymers produced mainly from α-olefins of 2 to 14 carbon atoms such as ethylene, propylene, 1-butene and 4-methyl-1-pentene, and (co)polymers produced mainly from vinylcyclohexane or styrene.

The second olefin polymerization catalyst of the invention may contain the same water as described for the first olefin polymerization catalyst.

The second olefin polymerization catalyst is a solid catalyst which is formed from the fine particle carrier, the component (A) and the component (B) and in which the component (A) and/or the component (B) is supported on the fine particle carrier. In order to support the component (A) and/or the component (B) on the fine particle carrier, for example, the fine particle carrier is brought into contact with the component (A) and/or the component (B) in an inert hydrocarbon solvent. Examples of the inert hydrocarbon solvents used herein are identical with those described hereinbefore.

In this invention, both the component (A) and the component (B) are preferably supported on the fine particle carrier. In the preparation of such catalyst, the contact sequence of the fine particle carrier, the component (A) and the component (B) is arbitrarily determined, but preferably the fine particle carrier is contacted first with the component (B) and then with the component (A). When a combination of the organoaluminum oxy-compound (b1) an the organoaluminum compound (b3) is used as the component (B), the fine particle carrier is contacted first with the component (b1), then with the component (A) and finally with the component (b3).

Next, one example of the ratio between the components used in the supporting procedure of the component (A) and/or the component (B) on the fine particle carrier is described.

In the mixing and contacting of the fine particle carrier, the component (A) and the component (B), the component (A) is used in an amount of usually $5 \times 10^{-6}$ to $5 \times 10^{-4}$ mol, preferably $10^{-5}$ to $2 \times 10^{-4}$ mol, in terms of the transition metal atom, per 1 g of the fine particle carrier, and the concentration of the component (A) is in the range of about $10^{-4}$ to $2 \times 10^{-2}$ mol/liter-solvent, preferably $2 \times 10^{-4}$ to $10^{-2}$ mol/liter-solvent.

When the organoaluminum oxy-compound (b1) is used as the component (B), an atomic ratio of aluminum in the component (b1) to the transition metal in the component (A), [Al/transition metal], is in the range of usually 10 to 10,000, preferably 20 to 5,000.

When the ionized ionic compound (b2) is used as the component (B), a molar ratio of the component (A) to the component (b2), [component (A)/component (b2)], is in the range of usually 0.01 to 10, preferably 0.1 to 5.

When a combination of the organoaluminum oxy-compound (b1) and the organoaluminum compound (b3) is used as the component (B), the amount of the component (b1) is the same as above, and an atomic ratio of the aluminum atom (Al-b3) in the component (b3) to the aluminum atom (Al-b1) in the component (b1), [Al-b3/Al-b1], is in the range of usually 0.02 to 20, preferably 0.2 to 10.

The temperature for mixing and contacting the fine particle carrier, the component (A) and the component (B) is in the range of usually −50° to 150° C., preferably −20° to 120° C., and the contact time is in the range of 1 minute to 50 hours, preferably 10 minutes to 25 hours.

When the solid catalyst (component) thus obtained is that prepared by using a combination of the component (b1) and the component (b3) as the component (B), it is desired that in this solid catalyst the transition metal atom derived from the component (A) is supported in an amount of $5 \times 10^{-6}$ to $5 \times 10^{-4}$ g·atom, preferably $10^{-5}$ to $2 \times 10^{-4}$ g·atom, per 1 g of the fine particle carrier, and the aluminum atom derived from both the component (b1) and the component (b3) is supported in an amount of $10^{-3}$ to $5 \times 10^{-2}$ g·atom, preferably $2 \times 10^{-3}$ to $2 \times 10^{-2}$ g·atom, per 1 g of the fine particle carrier.

The third olefin polymerization catalyst according to the invention is a prepolymerized catalyst obtained by prepolymerizing olefins on a solid catalyst component, said solid catalyst component comprising:

the fine particle carrier, (A) the transition metal compound represented by the above formula (I), and (B) at least one compound selected from:
(b1) the organoaluminum oxy-compound,
(b2) the ionizing ionic compound, and
(b3) the organoaluminum compound;

said component (A) and/or said component (B) being supported on the fine particle carrier.

In this invention, it is desired to use, as the component (B), the component (b1) singly or in combination with the component (b3).

The third olefin polymerization catalyst of the invention may contain the same water as described for the first olefin polymerization catalyst.

The prepolymerization can be carried out by introducing olefins into an inert hydrocarbon solvent in the presence of the fine particle carrier, the component (A) and the component (B). In the prepolymerization, it is preferred that the above-mentioned solid catalyst has been formed from the fine particle carrier, the component (A) and the component (B). In this case, at least one compound selected from the components (b1), (b2) and (b3) may be further added in addition to the solid catalyst component.

Examples of the olefins used in the prepolymerization include ethylene and α-olefins of 3 to 20 carbon atoms such as propylene, 1-butene, 3-methyl-1-butene, cyclopentene, 1-pentene, 4-methyl-1-pentene, 1-hexene, 1-octene, 1-decene, 1-dodecene and 1-tetradecene. Of these, particularly preferred is ethylene or a combination of ethylene and the same olefin as used in the polymerization.

Especially preferred is prepolymerization of ethylene alone and pre-copolymerization of ethylene (major component) and α-olefin (minor component, ex. 1 to 15 mol %, preferably 1 to 10 mol %) selected from those having 4 to 12 carbon atoms.

Examples of the inert hydrocarbon solvents used in the prepolymerization are identical with those described hereinbefore.

Next, one example of the ratio between the components used in the preparation of the prepolymerized catalyst is described.

In the prepolymerization of olefins in the presence of the fine particle carrier, the component (A) and the component (B), the component (A) is used in an amount of usually $5 \times 10^{-6}$ to $5 \times 10^{-4}$ mol, preferably $10^{-5}$ to $2 \times 10^{-4}$ mol, in terms of the transition metal atom, per 1 g of the fine particle carrier, and the concentration of the component (A) is in the range of about $10^{-4}$ to $2 \times 10^{-2}$ mol/liter-solvent, preferably $2 \times 10^{-4}$ to $10^{-2}$ mol/liter-solvent.

When the organoaluminum oxy-compound (b1) is used as the component (B), an atomic ratio of aluminum in the component (b1) to the transition metal in the component (A), [Al/transition metal], is in the range of usually 10 to 10,000, preferably 20 to 5,000.

When the ionized ionic compound (b2) is used as the component (B), a molar ratio of the component (A) to the component (b2), [component (A)/component (b2)], is in the range of usually 0.01 to 10, preferably 0.1 to 5.

When a combination of the organoaluminum oxy-compound (b1) and the organoaluminum compound (b3) is used as the component (B), the amount of the component (b1) is the same as above, and an atomic ratio of the aluminum atom (Al-b3) in the component (b3) to the aluminum atom (Al-b1) in the component (b1), [Al-b3/Al-b1], is in the range of usually 0.02 to 20, preferably 0.2 to 10.

The prepolymerization temperature is in the range of usually −20° to 80° C., preferably 0° to 60° C., and the prepolymerization time is in the range of 0.5 to 100 hours, preferably 1 to 50 hours.

It is desired that the amount of an olefin (co)polymer produced by the prepolymerization is in the range of 0.1 to 500 g, preferably 0.2 to 300 g, more preferably 0.5 to 200 g, per 1 g of the fine particle carrier.

When the prepolymerized catalyst thus obtained is that prepared by using a combination of the component (b1) and the component (b3) as the component (B), it is desired that in this prepolymerized catalyst the component (A) is supported in an amount of about $5 \times 10^{-6}$ to $5 \times 10^{-4}$ g·atom, preferably $10^{-5}$ to $2 \times 10^{-4}$ g·atom, in terms of the transition metal atom, per 1 g of the fine particle carrier, and the aluminum atom (Al) derived from both the component (b1) and the component (b3) is supported in such an amount that a molar ratio of the aluminum atom (Al) to the transition metal atom (M) derived from the component (A), [Al/M], is in the range of 5 to 200, preferably 10 to 150.

The prepolymerization may be carried out batchwise or continuously, and it may be carried out under reduced pressure, atmospheric pressure or pressure. In the prepolymerization, hydrogen is desirably allowed to coexist so as to prepare a prepolymer having an intrinsic viscosity [η], as measured in decalin at 135° C., of 0.2 to 7 dl/g, preferably 0.5 to 5 dl/g.

The olefin polymerization catalyst according to the invention can be used for polymerization of an olefin or copolymerization of two or more olefins, and is favorably used particularly for copolymerization of two or more olefins. When two or more olefins are copolymerized using the olefin polymerization catalyst of the invention, an olefin copolymer having a crystallization temperature and a melting point both lower than those of the conventionally known olefin polymers can be obtained even if the amounts of comonomers used in the polymerization are small.

Examples of the olefins which can be polymerized using the olefin polymerization catalyst of the invention include α-olefins of 2 to 20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

The olefin polymerization catalyst of the invention can be favorably used particularly for copolymerization of ethylene and an α-olefin of 3 to 20 carbon atoms, copolymerization of propylene and an α-olefin of 4 to 20 carbon atoms such as butene, copolymerization of propylene, ethylene and butene, etc.

Especially preferred is copolymerization of ethylene (major component) and α-olefin (minor component, ex. 1 to 15 mol %, preferably 1 to 10 mol %) selected from those having 4 to 12 carbon atoms.

The polymerization of an olefin or copolymerization of two or more olefins is carried out either in a gas phase or in a liquid phase such as slurry or solution. In the slurry polymerization or the solution polymerization, an inert hydrocarbon may be used as a solvent or the olefin itself may be used as the solvent.

Examples of the inert hydrocarbon solvents used for the slurry polymerization or the solution polymerization include aliphatic hydrocarbons, such as propane, butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosene and gas oil. Of these, preferred are aliphatic hydrocarbons, alicyclic hydrocarbons and petroleum fractions.

In the polymerization, the catalyst is desirably used in an amount of usually $10^{-8}$ to $10^{-3}$ g·atom/liter, preferably $10^{-7}$ to $10^{-4}$ g·atom/liter, in terms of the transition metal atom in the polymerization reaction system.

In the polymerization, an organoaluminum oxy compound and/or an organoaluminum compound, which are not supported, may be used in addition to the organoaluminum oxy-compound (component (b1)) and organoaluminum compound (compound (b3)) supported on the fine particle carrier. In this case, an atomic ratio of the aluminum atom (Al) derived from the organoaluminum oxy-compound and/or the organoaluminum compound which are not supported to the transition metal atom (M) derived from the transition metal compound (A), [Al/M], is in the range of 5 to 300, preferably 10 to 200, more preferably 15 to 150.

When the slurry polymerization is applied to the invention, the polymerization temperature is in the range of usually $-50°$ to $100°$ C., preferably $0°$ to $90°$ C.; when the solution polymerization is applied to the invention, the polymerization temperature is in the range of $-50°$ to $500°$ C., preferably $0°$ to $400°$ C.; and when the gas phase polymerization is applied to the invention, the polymerization temperature is in the range of $0°$ to $120°$ C., preferably $20°$ to $100°$ C.

The polymerization pressure is in the range of atmospheric pressure to 100 kg/cm$^2$, preferably 2 to 50 kg/cm$^2$. The polymerization may be carried out batchwise, semicontinuously or continuously.

The polymerization can be conducted in two or more stages having different reaction conditions.

EFFECT OF THE INVENTION

By the use of the olefin polymerization catalyst according to the invention, an olefin copolymer having a crystallization temperature and a melting point both lower than those of the conventional copolymers can be prepared from smaller feeding amounts of comonomers than those used conventionally.

In the process for olefin polymerization according to the invention, an olefin copolymer having a crystallization temperature and a melting point both lower than those of the conventional copolymers can be prepared in the case of that the feeding amount of comonomer is smaller than those used conventionally.

The olefin polymeization catalyst provided by the present invention, particularly supported on fine particle carrier and especially prepolymerized catalyst, is capable for giving polyolefin having large melt tension and improved moldability at high temperature.

EXAMPLE

The present invention will be further described with reference to the following examples, but it should be construed that the invention is in no way limited to those examples.

Example 1

Into a 1-liter glass reactor thoroughly purged with nitrogen was introduced 500 ml of toluene, and the temperature of the system was raised up to 50° C. Then, ethylene was fed to the reactor at a feed rate of 100N-liter/hr, and 35 ml of 1-octene, 0.5 mmol (in terms of Al atom) of methylaluminoxane and 0.005 mmol (in terms of zirconium atom) of bis(1,3-methylphenylcyclopentadienyl)zirconium dichloride were further added to initiate polymerization. After the polymerization was performed at 50° C. for 15 minutes, isopropanol was added to terminate the polymerization. Then, a polymer produced was entirely precipitated in 2 liters of methanol, and the polymer was filtered and dried at 80° C. for 6 hours.

As a result, 6.3 g of an ethylene/1-octene copolymer having a density of 0.88 g/cm$^3$, a melt flow rate (MFR) of 1.8 g/10 min, a melting point of 78° C. and a crystallization temperature of 47° C. was obtained.

Example 2

Polymerization of ethylene and 1-octene was carried out in the same manner as described in Example 1 except that the amount of 1-octene was varied to 20 ml.

As a result, 5.9 g of an ethylene/1-octene copolymer having a density of 0.90 g/cm$^3$, MFR of 0.96 g/10 min, a melting point of 93° C. and a crystallization temperature of 69° C. was obtained.

Comparative Example 1

Polymerization of ethylene and 1-octene was carried out in the same manner as described in Example 1 except that bis(1,3-methyl-n-butylcyclopentadienyl)zirconium dichloride was used in place of bis(1,3-methylphenylcyclopentadienyl)zirconium dichloride.

As a result, 11.5 g of an ethylene/1-octene copolymer having a density of 0.90 g/cm$^3$, MFR of 0.98 g/10 min, a melting point of 97° C. and a crystallization temperature of 73° C. was obtained.

Example 3

Into a 2-liter autoclave thoroughly purged with nitrogen was introduced 900 ml of hexane, and the temperature of the system was raised up to 80° C. To the system was fed 24N-liters of propylene, and was further fed ethylene so that the total pressure became 8 kg/cm$^2$-G. Then, 0.9 mmol of triisobutylaluminum, 0.1 mmol (in terms of Al atom) of methylaluminoxane and 0.001 mmol (in terms of zirconium atom) of bis(1,3-methylphenylcyclopentadienyl)zirconium dichloride were added to initiate polymerization. After the polymerization was performed at 80° C. for 60 minutes, the pressure was released. Then, a polymer produced was entirely precipitated in 2 liters of methanol, and the polymer was filtered and dried at 80° C. for 6 hours.

As a result, 52.1 g of an ethylene/propylene copolymer having an ethylene content, as measured by infrared spectrophotometry (IR), of 86.0% by mol and MFR of 0.10 g/10 min was obtained.

Example 4

[Preparation of solid catalyst component]

Into a reactor thoroughly purged with nitrogen was introduced 8.4 g of silica (mean particle diameter: 43 μm, specific surface area: 278 m$^2$/g, pore volume: 1.1 cm$^3$/g) having been dried at 250° C. for 10 hours, and thereto was added 130 ml of toluene to give a suspension. Then, the system was cooled to 0° C. To the system was then dropwise added 41.7 ml of a toluene solution of methylaluminoxane (Al: 1.54 mol/liter) over a period of 20 minutes. During the dropwise addition, the system was kept at 0° C. Subsequently, the reaction was performed at 0° C. for 30 minutes. Then, the temperature of the system was raised up to 95° C. over a period of 1 hour, and at this temperature, the reaction was performed for 4 hours. The system was then cooled to 60° C., and the supernatant liquid was removed by decantation to obtain a solid. The solid was washed twice with toluene and resuspended in toluene (total amount: 150 ml).

The resulting suspension of 50 ml was transferred into another reactor, and to the reactor were added 10 ml of toluene and 3.5 ml of a toluene solution of bis(1,3-methylphenylcyclopentadienyl)zirconium dichloride (Zr: 35.4 mmol/liter). Then, the temperature of the system was raised up to 80° C., and the reaction was performed at 80° C. for 2 hours. Thereafter, the supernatant liquid was removed, and the remainder was washed twice with hexane to obtain a solid catalyst component containing 3.0 mg of zirconium per 1 g of the catalyst component.

[Prepolymerization]

The solid catalyst component obtained was resuspended in hexane (total amount: 125 ml), and to the resulting suspension were added 6.2 ml of a decane solution of triisobutylaluminum (Al: 1 mol/liter) and 0.5 ml of 1-hexene. Then, prepolymerization was performed at 35° C. for 3.5 hours under atmospheric pressure with continuously feeding ethylene to the system. Thereafter, the prepolymerization reaction product was washed twice with hexane to obtain a prepolymerized catalyst. In the above procedure, sticking of the prepolymerized catalyst to the reactor wall was not found.

[Polymerization]

Into a 2-liter autoclave thoroughly purged with nitrogen were introduced 1 liter of hexane, 40 ml of 1-hexene and 0.75 ml of a decane solution of triisobutylaluminum (Al: 1 mol/liter), and the temperature of the system was raised up to 70° C. Then, 0.005 mg·atom (in terms of zirconium atom) of the prepolymerized catalyst obtained above was fed to the system together with ethylene, to initiate polymerization. Immediately, the temperature of the system rose to 80° C.. Then, the polymerization was performed at 80° C. for 3 hours under the total pressure of 8 kg/cm²-G with continuously feeding ethylene.

As a result, 289 g of an ethylene/1-hexene copolymer having a density of 0.93 g/cm³, MFR of 0.03 g/10 min, a melting point of 115° C. and a crystallization temperature of 99° C. was obtained.

Comparative Example 2

Preparation of a solid catalyst component, prepolymerization and polymerization of ethylene and 1-hexene were carried out in the same manner as described in Example 4 except that bis(1,3-methyl-n-butylcyclopentadienyl)zirconium dichloride was used in place of bis(1,3-methylphenylcyclopentadienyl)zirconium dichloride.

As a result, 218 g of an ethylene/1-hexene copolymer having a density of 0.93 g/cm³, MFR of 0.18 g/10 min, a melting point of 118° C. and a crystallization temperature of 101° C. was obtained.

The results are set forth in Table 1.

TABLE 1

| | Comonomer | | Density g/cm³ | MFR g/10 min | Melting point °C. | Crystallization temperature °C. | Ethylene content mol % |
|---|---|---|---|---|---|---|---|
| | Kind | Feeding amount | | | | | |
| Ex. 1 | 1-octene | 35 ml | 0.88 | 1.8 | 78 | 47 | 92.5 |
| Ex. 2 | 1-octene | 20 ml | 0.90 | 0.96 | 93 | 69 | 95.4 |
| Comp. Ex. 1 | 1-octene | 35 ml | 0.90 | 0.98 | 97 | 73 | 95.8 |
| Ex. 3 | propylene | 24 Nl | — | 0.10 | 65 | 49 | 86.0 |
| Ex. 4 | 1-hexene | 40 ml | 0.93 | 0.03 | 115 | 99 | 98.6 |
| Comp. Ex. 2 | 1-hexene | 40 ml | 0.93 | 0.18 | 118 | 101 | 98.6 |

Example 5

Polymerization of ethylene and 1-hexene was carried out in the same manner as described in Example 4 except for feeding ethylene gas containing 0.1 mol % of hydrogen gas.

Melt tension (MT (g)) of the resulting polymer is determined by measuring a stress given when a molten copolymer is stretched at a constant rate. That is, a powdery polymer was melted in a conventional manner, and the molten polymer was pelletized to give a measuring sample. Then, the MT of the sample was measured under the conditions of a resin temperature of 190° C., an extrusion rate of 15 mm/min and a take-up rate of 10 to 20 m/min using a MT measuring apparatus (produced by Toyo Seiki Seisakusho K.K.) having a nozzle diameter of 2.09 mmφ and a nozzle length of 8 mm.

The results are set forth in Table 2.

Example 6

Polymerization of ethylene and 1-hexene was carried out in the same manner as described in Example 5 except that bis(1,3-methyl-p-tolylcyclopentadienyl)zirconium dichloride was used in place of bis(1,3-methylphenylcyclopentadienyl)zirconium dichloride.

The results are set forth in Table 2.

Comparative Example 3

Preparation of a solid catalyst component, prepolymerization and polymerization of ethylene and 1-hexene were carried out in the same manner as described in Example 5 except that bis(1,3-methyl-n-butylcyclopentadienyl)zirconium dichloride was used in place of bis(1,3-methylphenylcyclopentadienyl)zirconium dichloride, and feeding ethylene gas containing 0.05 mol % of hydrogen gas The results are set forth in Table 2.

TABLE 2

|  | Comonomer | | Density g/cm³ | MFR g/10 min | Melting point °C. | Crystallization temper. °C. | Ethylene content mol % | Melt Tension (g) |
|---|---|---|---|---|---|---|---|---|
|  | Kind | Feeding amount | | | | | | |
| Ex. 5 | 1-hexene | 40 ml | 0.94 | 1.53 | 119 | 105 | 98.9 | 2.5 |
| Ex. 6 | 1-hexene | 40 ml | 0.94 | 1.22 | 121 | 106 | 98.9 | 3.0 |
| Comp Ex. 3 | 1-hexene | 40 ml | 0.94 | 1.44 | 123 | 108 | 98.8 | 1.0 |

By the present invention, resulting polyolefin is high in melt tension and has good moldability.

What is claimed is:

1. An olefin polymerization catalyst comprising:
   (A) a transition metal compound represented by the following formula (I):

$$R^1R^2MX_2 \qquad (I)$$

wherein M is a transition metal atom selected from Group IVB of the periodic table, $R^1$ and $R^2$ are each a ligand coordinated to the transition metal atom M, are each a cycloalkadienyl group having at least two substituents, and may be the same as or different from each other, one of the substituents for substituting the cycloalkadienyl group is an aryl group and the other is a saturated group of 1 to 12 carbon atoms, X is a group or an atom selected from a hydrocarbon group of 1 to 12 carbon atoms, an alkoxy group, an aryloxy group, a trialkylsilyl group and a halogen atom, and two of X may be the same as or different from each other;

and
   (B) at least one compound selected from:
      (b1) an organoaluminum oxy-compound,
      (b2) an ionizing ionic compound, and
      (b3) an organoaluminum compound.

2. An olefin polymerization catalyst comprising:
   a fine particle carrier;
   (A) a transition metal compound represented by the following formula (I):

$$R^1R^2MX_2 \qquad (I)$$

wherein M is a transition metal atom selected from Group IVB of the periodic table, $R^1$ and $R^2$ are each a ligand coordinated to the transition metal atom M, are each a cycloalkadienyl group having at least two substituents, and may be the same as or different from each other, one of the substituents for substituting the cycloalkadienyl group is an aryl group and the other is a saturated group of 1 to 12 carbon atoms, X is a group or an atom selected from a hydrocarbon group of 1 to 12 carbon atoms, an alkoxy group, an aryloxy group, a trialkylsilyl group and a halogen atom, and two of X may be the same as or different from each other;

and
   (B) at least one compound selected from:
      (b1) an organoaluminum oxy-compound,
      (b2) an ionizing ionic compound, and
      (b3) an organoaluminum compound;
   said component (A) or said component (B) being supported on the fine particle carrier.

3. An olefin polymerization catalyst obtained by prepolymerizing olefins on a catalyst component, said catalyst component comprising:
   a fine particle carrier;
   (A) a transition metal compound represented by the following formula (I):

$$R^1R^2MX_2 \qquad (I)$$

wherein M is a transition metal atom selected from Group IVB of the periodic table, $R^1$ and $R^2$ are each a ligand coordinated to the transition metal atom M, are each a cycloalkadienyl group having at least two substituents, and may be the same as or different from each other, one of the substituents for substituting the cycloalkadienyl group is an aryl group and the other is a saturated hydrocarbon group of 1 to 12 carbon atoms, X is a group or an atom selected from a hydrocarbon group of 1 to 12 carbon atoms, an alkoxy group, an aryloxy group, a trialkylsilyl group and a halogen atom, and two of X may be the same as or different from each other;

and
   (B) at least one compound selected from:
      (b1) an organoaluminum oxy-compound,
      (b2) an ionizing ionic compound, and
      (b3) an organoaluminum compound;
   said component (A) or said component (B) being supported on the fine particle carrier.

* * * * *